United States Patent
Ait Aoudia et al.

(10) Patent No.: US 11,722,240 B2
(45) Date of Patent: Aug. 8, 2023

(54) RATE ADAPTATION

(71) Applicant: NOKIA TECHNOLOGIES OY, Espoo (FI)

(72) Inventors: Faycal Ait Aoudia, Saint-Cloud (FR); Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 72 days.

(21) Appl. No.: 17/482,610

(22) Filed: Sep. 23, 2021

(65) Prior Publication Data
US 2022/0094462 A1    Mar. 24, 2022

(30) Foreign Application Priority Data
Sep. 24, 2020 (FI) ..................................... 20205925

(51) Int. Cl.
*H04L 1/00* (2006.01)
*H04L 1/20* (2006.01)
*H04W 72/542* (2023.01)

(52) U.S. Cl.
CPC ............ *H04L 1/0003* (2013.01); *H04L 1/206* (2013.01); *H04W 72/542* (2023.01)

(58) Field of Classification Search
CPC ..... H04L 1/0003; H04L 1/206; H04W 72/542
USPC ........................................................ 370/329
See application file for complete search history.

(56) References Cited

U.S. PATENT DOCUMENTS

| 7,369,510 B1 | 5/2008 | Wong et al. |
| 2005/0100045 A1 | 5/2005 | Hunkeler et al. |
| 2007/0230324 A1* | 10/2007 | Li ..................... H04L 1/0026 370/204 |

FOREIGN PATENT DOCUMENTS

| EP | 1 501 231 A1 | 1/2005 | |
| KR | 20140123870 * | 4/2013 | ............... H04B 7/04 |
| WO | 2005/081439 A1 | 9/2005 | |

OTHER PUBLICATIONS

Office Action and Search Report dated Apr. 12, 2021 corresponding to Finnish Patent Application No. 20205925.
(Continued)

*Primary Examiner* — Christopher R Crompton
(74) *Attorney, Agent, or Firm* — Squire Patton Boggs (US) LLP

(57) ABSTRACT

This specification describes an apparatus relating to rate adaptation. The apparatus may comprise a processor and a memory including instructions, the instructions, when executed by the processor, cause the apparatus to provide first data representing an estimate of a communications link based on a signal received over said communications link from a transmitter. The apparatus may determine an estimated achievable data rate over said communications link for each of a plurality of link configurations which have respective combinations of modulation scheme and pilot symbol pattern which correspond to one or more transmitter link configurations, the estimated achievable data rate for a particular link configuration being determined based on the first data, and the modulation scheme and the pilot pattern of the particular reference link configuration. The apparatus may select a transmitter link configuration based on the estimated achievable data rates.

20 Claims, 9 Drawing Sheets

(56) References Cited

OTHER PUBLICATIONS

R. C. Daniels, "Machine Learning for Link Adaptation in Wireless Networks," University of Texas, Dec. 2011, http://hdl.handle.net/2152/ETD-UT-2011-12-4509.

LTE, "Evolved Universal Terrestrial Radio Access (E-UTRA); Physical layer procedures (3GPP TS 36.213 version 15.9.0 Release 15)," ETSI TS 136 213 V15.9.0 (Apr. 2020), Apr. 2020.

S. Pfletschinger et al., "Versatile Link Adaptation Based on Mutual Information," In: IEEE Intl. Conf. Commun. (ICC), May 2010.

LTE, Evolved Universal Terrestrial Radio Access (E-UTRA); Physical channels and modulation (3GPP TS 36.211 version 15.9.0 Release 15), ETSI TS 136 211 V15.9.0 (Apr. 2020), Apr. 2020.

Communication of Acceptance—section 29 a of Patents Decree dated Oct. 14, 2022 corresponding to Finnish Patent Application No. 20205925.

Extended European Search Report dated Mar. 11, 2022 corresponding to European Patent Application No. 21198157.6.

Anxo Tato et al., "Spatial Modulation Link Adaptation: a Deep Learning Approach," 2019 53rd Asilomar Conference on Signals, Systems, and Computers, IEEE, Nov. 3, 2019, pp. 1801-1805, XP033750727.

\* cited by examiner

| CONFIGURATION (C) | MODULATION SCHEME M | PILOT PATTERN P | CODE RATE u | RATE r(C) (BITS/PRB) |
|---|---|---|---|---|
| 1 | QPSK | $P_1$ | $u_1$ | $r_1$ |
| 2 | QPSK | $P_1$ | $u_2$ | $r_2$ |
| 3 | QAM16 | $P_2$ | $u_3$ | $r_3$ |
| 4 | QAM16 | $P_3$ | $u_2$ | $r_4$ |
| 5 | QAM16 | $P_2$ | $u_3$ | $r_5$ |

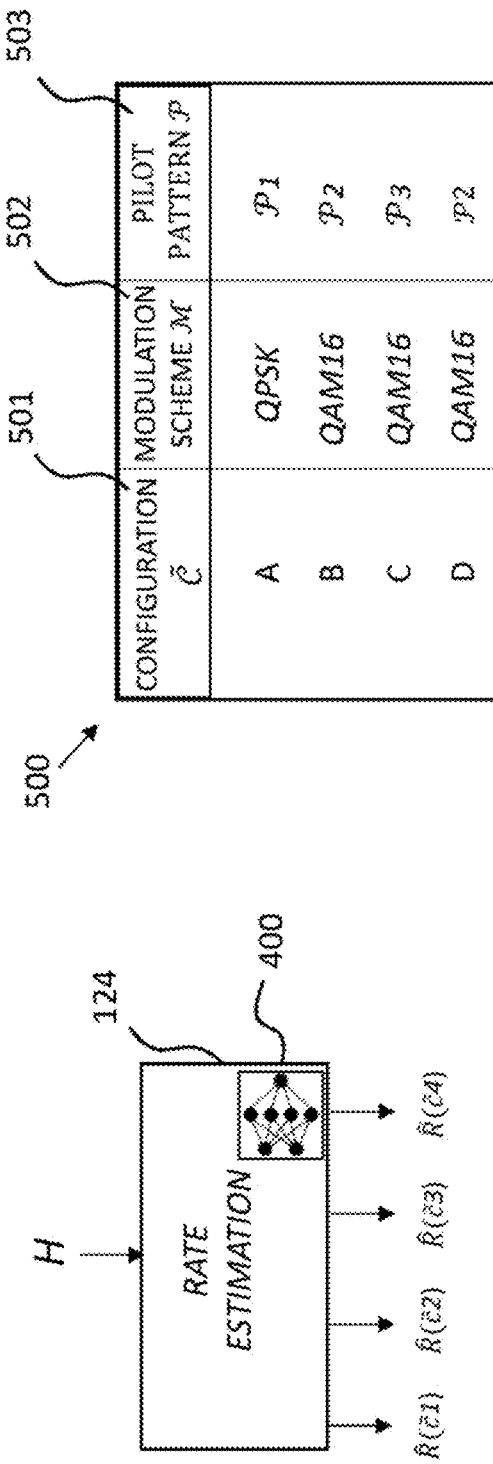
| CONFIGURATION $\tilde{c}$ | MODULATION SCHEME $\mathcal{M}$ | PILOT PATTERN $\mathcal{P}$ |
|---|---|---|
| A | QPSK | $\mathcal{P}_1$ |
| B | QAM16 | $\mathcal{P}_2$ |
| C | QAM16 | $\mathcal{P}_3$ |
| D | QAM16 | $\mathcal{P}_2$ |
FIG. 5
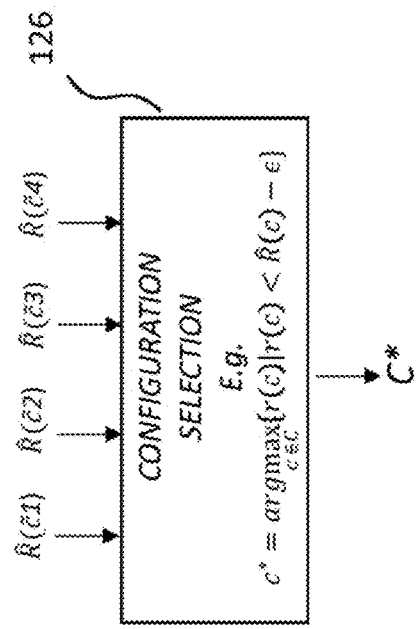
FIG. 8
FIG. 4

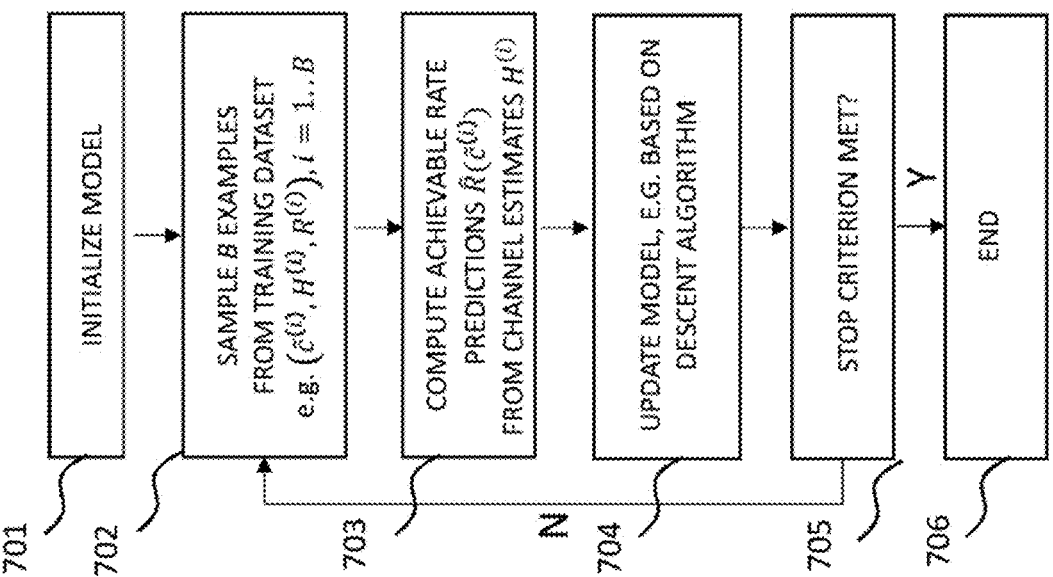
FIG. 7
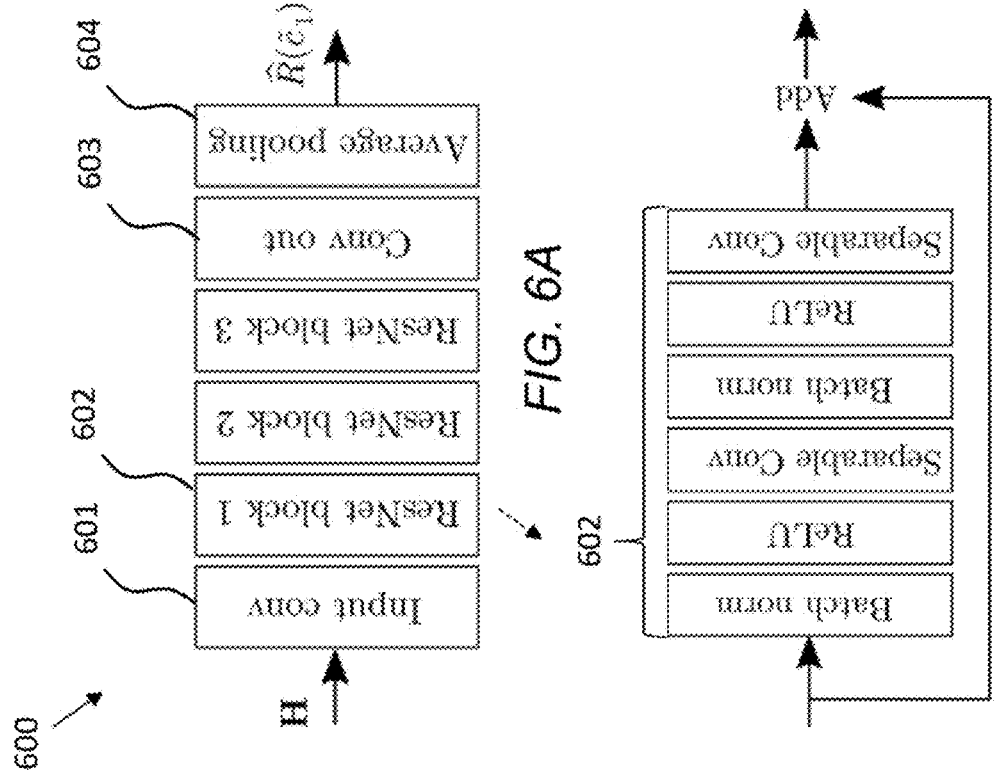
FIG. 6A
FIG. 6B

| CONFIGURATION (C) | MODULATION SCHEME $\mathcal{M}$ | PILOT PATTERN $\mathcal{P}$ | CODE RATE $\mathcal{U}$ | RATE $r(c)$ (BITS/PRB) | $\hat{R}(c)$ (BITS/PRB) |
|---|---|---|---|---|---|
| 1 | QPSK | $p_1$ | $u_1$ | $r1$ | $\hat{R}(c1)$ |
| 2 | QPSK | $p_1$ | $u_2$ | $r2$ | $\hat{R}(c1)$ |
| 3 | QAM16 | $p_2$ | $u_3$ | $r3$ | $\hat{R}(c2)$ |
| 4 | QAM16 | $p_3$ | $u_2$ | $r4$ | $\hat{R}(c3)$ |
| 5 | QAM16 | $p_2$ | $u_3$ | $r5$ | $\hat{R}(c4)$ |

RATE ADAPTATION

FIELD

The present specification relates to an apparatus and method for rate adaptation.

BACKGROUND

In communications, rate adaptation generally comprises a receiving system causing a transmitting system to adapt how data is transmitted to the receiving system (or possibly another receiving system) over a communications link, for example based on link conditions, in order to achieve a particular data throughput with low error rate.

SUMMARY

The scope of protection sought for various aspects of the invention is set out by the independent claims. The aspects and features, if any, described in this specification that do not fall under the scope of the independent claims are to be interpreted as examples useful for understanding the various aspects of the invention.

According to a first aspect, this specification describes an apparatus, comprising: a processor; and a memory including instructions, the instructions, when executed by the processor, cause the apparatus to: provide first data representing an estimate of a communications link based on a signal received over said communications link from a transmitter; determine an estimated achievable data rate over said communications link for each of a plurality of link configurations which have respective combinations of modulation scheme and pilot symbol pattern which correspond to one or more transmitter link configurations, the estimated achievable data rate for a particular link configuration being determined based on the first data, and the modulation scheme and the pilot pattern of the particular reference link configuration; and select a transmitter link configuration based on the estimated achievable data rates.

The first data may represent a plurality of complex coefficients respectively representing individual link estimates for a plurality of resource elements comprising all or a majority of the resource elements of a resource grid of the received signal.

The estimated achievable data rate for each of the link configurations may be computed using a computational model which receives the first data as input.

The computational model may be trained based on a training dataset comprising, for each link configuration, (i) first training data representing one or more link estimates and, (ii) second training data representing an achievable data rate for the one or more link estimates of each link configuration.

One or more of the first and second training data may be provided using measured and/or simulated data.

The first training data may comprise a plurality of complex coefficients respectively representing individual link estimates for a plurality of resource elements comprising all or a majority of the resource elements of a resource grid The second training data may be provided by calculating mathematically an estimate of a true achievable data rate for a given batch of the first training data for each link configuration.

The estimate of the true achievable data rate may be calculated mathematically based on bit-wise mutual information and using an expression which depends only on the modulation scheme and pilot symbol pattern of the particular link configuration.

The computational model may be trained by iteratively updating parameters using a stochastic descent algorithm.

The estimated achievable data rates may be determined in units of bits per physical resource block (bits/PRB).

Each of the transmitter link configurations may have an advertised data rate, and wherein the apparatus is configured to select the link configuration by: filtering the transmitter link configurations to exclude those having an advertised data rate greater than the estimated achievable data rate for the corresponding link configuration; and selecting one of the remaining link configurations.

The selected transmitter link configuration may be that having the highest advertised data rate.

Prior to filtering, the advertised data rate for each of the transmitter link configurations may be reduced by a predetermined parameter $\in$.

The first data may represent estimated frequency response characteristics of a communications link based on receipt of a multi-carrier modulated signal.

The multi-carrier modulated signal may be an Orthogonal Frequency Division Multiplexing (OFDM) modulated signal.

The first data may represent a plurality of complex coefficients in a physical resource block of the multi-carrier modulated signal.

The apparatus may be a communications receiver which is further configured to send an indication of the selected link configuration to the transmitter.

The apparatus may be the transmitter, the first data being provided by a communications receiver based on the received signal.

According to a second aspect, this specification describes an apparatus, comprising means for: providing first data representing an estimate of a communications link based on a signal received over said communications link from a transmitter; determining an estimated achievable data rate over said communications link for each of a plurality of link configurations which have respective combinations of modulation scheme and pilot symbol pattern which correspond to one or more transmitter link configurations, the estimated achievable data rate for a particular link configuration being determined based on the first data, and the modulation scheme and the pilot pattern of the particular reference link configuration; and selecting a transmitter link configuration based on the estimated achievable data rates.

The first data may represent a plurality of complex coefficients respectively representing individual link estimates for a plurality of resource elements comprising all or a majority of the resource elements of a resource grid of the received signal.

The estimated achievable data rate for each of the link configurations may be computed using a computational model which receives the first data as input.

The computational model may be trained based on a training dataset comprising, for each link configuration, (i) first training data representing one or more link estimates and, (ii) second training data representing an achievable data rate for the one or more link estimates of each link configuration.

One or more of the first and second training data may be provided using measured and/or simulated data.

The first training data may comprise a plurality of complex coefficients respectively representing individual link estimates for a plurality of resource elements comprising all or a majority of the resource elements of a resource grid The second training data may be provided by calculating mathematically an estimate of a true achievable data rate for a given batch of the first training data for each link configuration.

The estimate of the true achievable data rate may be calculated mathematically based on bit-wise mutual information and using an expression which depends only on the modulation scheme and pilot symbol pattern of the particular link configuration.

The computational model may be trained by iteratively updating parameters using a stochastic descent algorithm.

The estimated achievable data rates may be determined in units of bits per physical resource block (bits/PRB).

Each of the transmitter link configurations may have an advertised data rate, and wherein the apparatus is configured to select the link configuration by: filtering the transmitter link configurations to exclude those having an advertised data rate greater than the estimated achievable data rate for the corresponding link configuration; and selecting one of the remaining link configurations.

The selected transmitter link configuration may be that having the highest advertised data rate.

Prior to filtering, the advertised data rate for each of the transmitter link configurations may be reduced by a predetermined parameter $\in$.

The first data may represent estimated frequency response characteristics of a communications link based on receipt of a multi-carrier modulated signal.

The multi-carrier modulated signal may be an Orthogonal Frequency Division Multiplexing (OFDM) modulated signal.

The first data may represent a plurality of complex coefficients in a physical resource block of the multi-carrier modulated signal.

The apparatus may be a communications receiver which is further configured to send an indication of the selected link configuration to the transmitter.

The apparatus may be the transmitter, the first data being provided by a communications receiver based on the received signal.

According to a third aspect, this specification describes a method comprising: providing first data representing an estimate of a communications link based on a signal received over said communications link from a transmitter; determining an estimated achievable data rate over said communications link for each of a plurality of link configurations which have respective combinations of modulation scheme and pilot symbol pattern which correspond to one or more transmitter link configurations, the estimated achievable data rate for a particular link configuration being determined based on the first data, and the modulation scheme and the pilot pattern of the particular reference link configuration; and selecting a transmitter link configuration based on the estimated achievable data rates.

According to a fourth aspect, this specification describes a computer program comprising a set of instructions which, when executed on an apparatus, is configured to: provide first data representing an estimate of a communications link based on a signal received over said communications link from a transmitter; determine an estimated achievable data rate over said communications link for each of a plurality of link configurations which have respective combinations of modulation scheme and pilot symbol pattern which correspond to one or more transmitter link configurations, the estimated achievable data rate for a particular link configuration being determined based on the first data, and the modulation scheme and the pilot pattern of the particular reference link configuration; and select a transmitter link configuration based on the estimated achievable data rates.

BRIEF DESCRIPTION OF THE FIGURES

Examples will now be described, by way of example only, with reference to the accompanying drawings in which:

FIG. 4 is a block diagram of a rate estimation module according to an example embodiment;

FIG. 5 is a tabular representation of a data structure indicating different reference link configurations according to an example embodiment;

FIG. 6A is a schematic view of a neural network for providing a computational model according to an example embodiment;

FIG. 6B is a schematic view of part of the FIG. 6A neural network;

FIG. 7 is a flow diagram indicating operations for training a computational model according to an example embodiment;

FIG. 8 is a block diagram of a configuration selection module according to an example embodiment;

DETAILED DESCRIPTION

Figure 1:
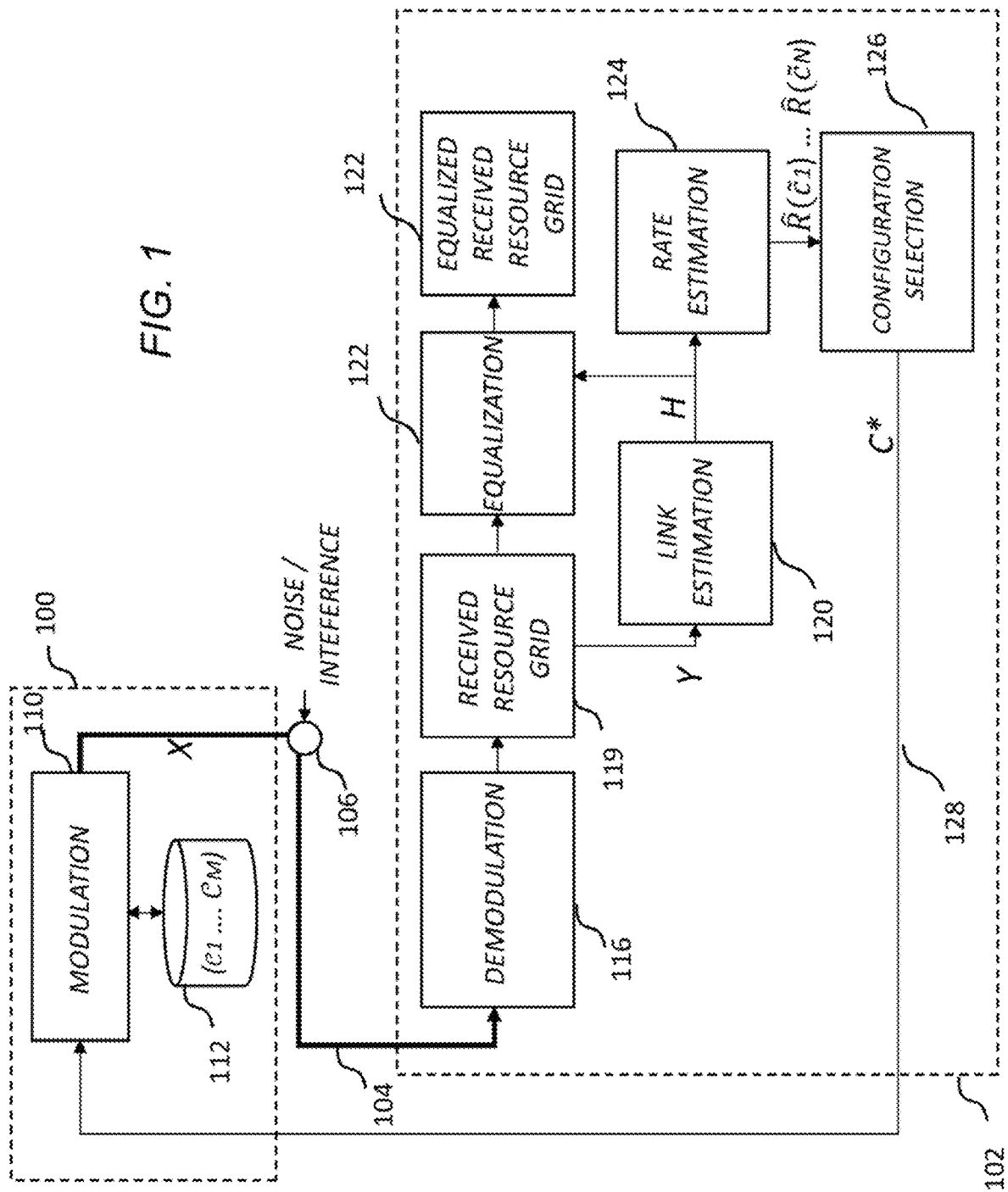
FIG. 1 is a block diagram of a system according to an example embodiment.

In the description and drawings, like reference numerals refer to like elements throughout.

Example aspects relate to rate adaptation, and particularly to an apparatus, method and/or computer program product for performing operations at a receiving means, for determining and sending to a transmitting means an indication of how to adapt a current transmitter link configuration to use a different one of a plurality of other link configurations usable by the transmitting means. In an alternative embodiment, the operations may be performed at a transmitting means.

Example aspects focus on transmitting and receiving means configured for respectively encoding and decoding data using Orthogonal Frequency Division Multiplexing (OFDM). However, embodiments herein may also be used with other encoding and decoding schemes in which the transmitting means may adapt how data is transmitted based on selection of one of a plurality of predetermined transmitter link configurations (i.e. usable by the transmitting means), and consequently may adapt the data throughput for the link whilst ensuring a relatively low and therefore appropriate error rate.

As used herein, a communications link may refer to a communications channel, which may be a wired or wireless communications channel.

As used herein, a transmitting means ("transmitter") and receiving means ("receiver") may refer to any type of transmitting and receiving apparatus or system involved in communications using such above-mentioned encoding and decoding schemes. For example, OFDM is commonly used for mobile communications (e.g. Long Term Evolution (LTE), Fourth Generation (4G) and Fifth Generation (5G) mobile communications), for example in the downlink from a base station to one or more mobile terminals, and also in fields such as internet communications, power line networks, digital audio broadcasting (DAB) and so on.

As used herein, "providing" may mean "receiving", "generating" or "determining".

FIG. 1 is a block diagram of an example system according to some example aspects, the system comprised of a transmitter 100 and a receiver 102 connected by a communications link 104. As will be appreciated, the link 104 may encounter noise or interference 106 which is represented in the Figure, this having the effect of degrading to some extent a frequency response of a modulated signal transmitted by the transmitter 100. The link 104 may comprise a wired or wireless link. It will be assumed herein that the link 104 is wireless and therefore "over-the-air".

The transmitter 100 and receiver 102 may be configured to respectively encode and decode data using OFDM. OFDM is one of a broader class of multicarrier modulation schemes in which data is carried over multiple, lower rate sub-carriers. OFDM may offers advantages in terms of robustness against the indicated noise/interference 106. In overview, OFDM involves mapping data to symbols, each symbol indicated by a complex number representing an amplitude and phase, with the symbols being divided, in the time domain, into a plurality of parallel slots, and in the frequency domain, into a plurality of N sub-carriers. The frequencies of the N sub-carriers are selected so that they are mutually orthogonal over one symbol period which permits recovery of each symbol stream independently of the others with reduced risk of inter symbol interference (ISI).

Figures 2, 3:
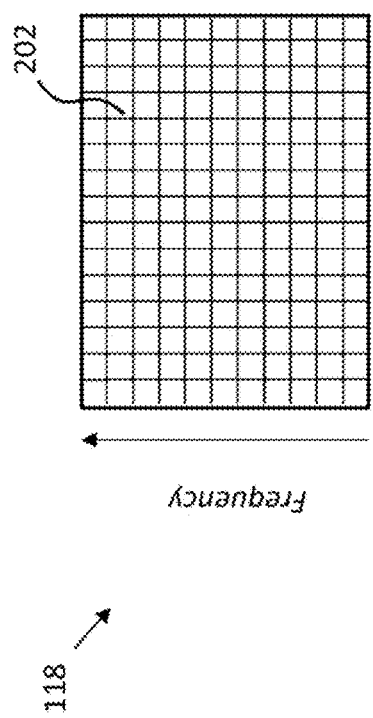
FIG. 2 is a schematic view of a time and frequency resource grid.
FIG. 3 is a tabular representation of a data structure indicating different transmitter link configurations according to an example embodiment.

FIG. 2 is a schematic view of a time and frequency grid 118, or resource grid, which may be useful for understanding example aspects. The above-mentioned symbols may be considered allocated to a particular part of the resource grid 118, referred to as a resource element 202. Multiple resource elements 202 may be grouped into a resource block which may be considered the smallest unit of resources that can be allocated to a user. Resource blocks may be referred to as physical resource blocks (PRBs) given that they relate to the physical layer.

Within the resource grid 118 may be allocated so-called pilot symbols. A pilot symbol comprises a form of reference signal which may be used for so-called link estimation. Link estimation refers to an estimation of the link's frequency response. Pilot symbols are mapped to known locations within the resource grid 118 and the receiver 102 can extract the reference signals from the locations of the pilot symbols to estimate the link frequency response, usually using a least squares (LS) estimate approach.

Referring back to FIG. 1, the transmitter wo comprises a modulation module no which modulates data according to what may be considered a resource grid representing a plurality of sub-frames of the data.

The modulation module 110 is configured to use one of a set of so-called transmitter link configurations $\mathcal{C}$, each one of the set having a respective combination of parameters, including (i) a particular modulation scheme $\mathcal{M}$, (ii) a particular pilot symbol pattern P and (iii) a particular code rate U. The transmitter link configurations $\mathcal{C}$ (i.e. those usable by the transmitter 100) in said set are herein referred to as "usable link configurations" and may be defined in a standard. In FIG. 1, access to some form of data structure, referred to as a usable configurations (UC) table, indicative of the usable link configurations $\mathcal{C}$ for that transmitter 100 is indicated in FIG. 1 by reference numeral 112. The UC table 112 may comprise, for example, a data structure comprising at least some information from what is commonly referred to as a Modulation and Coding Scheme (MCS) table and additional information in the form of different pilot patterns which may be determined as part of a particular standard. The UC table 112 may be provided in any suitable form or format and may even be external to the transmitter wo and accessed via a network.

An example of a particular UC table 300 is shown in FIG. 3. Each usable link configuration $\mathcal{C}$ is given a simple value or index in a first column 301, for convenient reference herein.

A second column 302 of the UC table 300 indicates a particular modulation scheme $\mathcal{M}$. The available modulation schemes M may, for example, comprise quadrature phase-shift keying (QPSK) or quadrature amplitude modulation (QAM) with different modulation orders available, such as 16, 64 and 256. Higher modulation orders may enable higher throughput, but at the cost of lower robustness to noisy links. Other modulation schemes may also be used, depending on the standard.

A third column 303 of the UC table 300 indicates a particular pilot pattern P. The available pilot patterns P may be pre-defined in a standard, e.g., comb-type with specific spacings in the frequency and time domain.

A fourth column 304 of the UC table 300 indicates a particular code rate U. The available code rates U may take values in the range (0,1) and control the amount of redundancy introduced to recover from errors. A higher code rate U leads to higher useful throughput, because less redundancy is introduced, but at the cost of lower resilience to errors. Only a finite set of code rates are generally available in the standards.

It will be seen that the first and second configurations have identical values of modulation scheme $\mathcal{M}$ and pilot pattern P and different values of code rate U.

We may denote by $\mathcal{M} = \{m_1, \ldots, m_M\}$ the set of M modulations schemes available. Similarly, we may denote by $\mathcal{P} = \{p_1, \ldots, p_P\}$ the set of P pilot patterns available and by $\mathcal{U} = \{u_1, \ldots, u_U\}$ the set of U code rates available for modulation and transmission by the modulation module no of the transmitter 100.

Collectively, the set of usable link configurations $\mathcal{C}$ may comprise tuples $c = (m_i, u_j, p_k)$ such that $m_i \in \mathcal{M}$, $u_j \in \mathcal{U}$ and $p_k \in \mathcal{P}$. Not all combinations of modulation schemes, pilot patterns and code rates need to be in $\mathcal{C}$, as some combinations may not be handled by the transmitter/receiver 100, 102 or may not be included in the standard.

Each usable link configuration $c=(m_i,u_j,p_k)\in\mathcal{C}$ may be associated with a advertised data rate r(c), which may be expressed in bits per physical resource block (bits/PRB) and which is the product of three elements:
- the number of bits per channel used that can be transmitted with the modulation scheme $m_i$, e.g., 2 with QPSK, 4 with 16QAM etc.;
- the code rate $u_j$, e.g., ½, ¾ . . . ; and
- the number of resource elements carrying data symbols in a PRB using the pilot pattern $p_k$.

As shown in FIG. 3, a fifth column 305 of the UC table 300 indicates a respective advertised data rate r(c) associated with each usable link configuration c.

The data rate r(c) may be considered "advertised" in that it is predefined in the particular standard UC table 300 as indicative of an achievable data rate with low error.

Example aspects may relate to selecting a particular configuration c from the set of usable configurations $\mathcal{C}$ with a data rate r(c) that achieves improved throughput whilst maintaining a low probability of error, given the current channel state.

Referring back to FIG. 1, at the receiver 102, demodulation is performed (OFDM demodulation in this example) to derive a received resource grid 119 which may form the basis of link estimation 120. As is known, the received resource grid 119 may also be used for equalization 122 to produce a frequency-domain equalized received resource grid 122 from which the original data can be obtained.

A link estimation module 120 may be used to estimate the frequency response of the link 104 using conventional techniques. This may be referred to as link estimation and, in some example aspects, link estimation is performed for all, or the majority of resource elements 202 of a received resource grid 119 (according to how the resource grid is defined in the relevant communications standard). The received resource grid 119 may, for example, comprise a physical resource block (PRB) in OFDM. Link estimation may be performed for resource elements 202 associated with locations of pilot symbols, as well as other resource elements which may carry no data or non-pilot data.

The link estimate provided by the link estimation module 120 may therefore comprise data representing a matrix of complex numbers or coefficients, corresponding to all or the majority of resource elements 202 of the received resource grid 119, having time slots and sub-carriers as first and second dimensions or a three-dimensional tensor having as a third dimension real and imaginary components of link coefficient estimates. The coefficients of the received resource grid 119 may be considered as respective individual estimates of different link realizations for each resource element 202.

As noted above, link estimation may be performed based on the known pattern (locations) of pilot symbols for a current link configuration c within the received resource grid 119 using a LS estimate or similar calculation.

Link estimation in respect of the pilot symbol resource elements may therefore involve first extracting the pilot symbols from their known locations within a received sub-frame and, because their locations are known, the channel frequency response at these locations can be determined using an LS estimate. The LS estimate may be obtained by dividing the received pilot symbols by their expected value. This may be derived from:

$$Y = H \cdot X + \text{Noise} \quad (1)$$

where Y is a received symbol value, X is a transmitted symbol value and H is the complex link gain experienced by a symbol, and may comprise the channel estimate. The notations Y, X and H are shown in FIG. 1 for convenience.

For non-pilot resource elements, the same process may also be performed using, for example, linear minimum mean square error (LMMSE) channel estimation or Wiener filtering or simple linear interpolation. Data-aided channel estimation could also be used.

In example aspects, rate adaptation may therefore be performed based on the received channel estimate H for the entire, or a major proportion of, the received resource grid 119.

More specifically, the received channel estimate H may be used firstly to estimate, for each of a plurality of so-called reference link configurations $\tilde{c}$, having respective combinations of modulation scheme $\mathcal{M}$ and pilot symbol pattern $\mathcal{P}$, an estimated achievable data rate $\hat{R}$ over the communications link 104.

Rate Estimation Module 124

As shown in FIG. 1, and in more detail with reference to FIG. 4, a rate estimation module 124 may be provided for this purpose, which may take as input a dataset representing the channel estimate H and which may generate as output a set of estimated achievable data rates $\hat{R}(\tilde{c}1)$ . . . $\hat{R}(\tilde{c}N)$ for each of the respective reference link configurations $\tilde{c}$.

Referring to FIG. 5, an example set of reference link configurations $\tilde{c}$ are shown in the form of a reference configurations (RC) table 500. The RC table 500 may be stored at the receiver 102 or is at least accessible to the receiver. The reference link configurations $\tilde{c}$ in the RC table 500 may correspond to one or more of the usable link configurations $\mathcal{C}$ referred to above in relation to the UC table 300, in that they have the same or similar values of $\mathcal{M}$ and $\mathcal{P}$. For reasons that will become clear, the reference link configurations $\tilde{c}$ need not account for different values of code rate $\mathcal{U} = \{u_1, \ldots, u_U\}$ because the estimated achievable data rate is not dependent on the code rate. A first column 501 of the RC table 500 represents a simple value or index for convenient reference herein (given as letters "A-D" to distinguish over the UC table 300 shown in FIG. 3). A second column 502 indicates modulation schemes $\mathcal{M}$ and a third column 503 indicates pilot patterns P. Because code rates are not needed, the RC table 500 comprises only four entries because entry "A" may correspond to both the first and second entries "#1" and "#2" in the UC table 300.

The rate estimation module 124 may comprise a computational model 400, for example a neural network, trained based on one or more datasets for generating the above-mentioned estimated achievable data rates $\hat{R}(\tilde{c}1)$ . . . $R(\tilde{c}N)$ for the respective reference link configurations $\tilde{c}$, as will be explained below.

The computational model 400 may comprise any known form of trainable model which may, for example, be initialized in terms of its parameters (or weights) with random or specific values. The computational model 400 may then be trained based on a training dataset, usually using a descent algorithm such as stochastic gradient descent (SGD), or similar, to reduce or minimize a loss function iteratively until a stop criterion (or criteria) is (or are) reached.

In example aspects, the training dataset may comprise a dataset of tuples ($\tilde{c}$, H, R), where $\tilde{c}$ refers to the different combinations of the reference link configurations $\tilde{C}$ (i.e. modulation scheme $\mathcal{M}$ and pilot pattern $\mathcal{P}$), H refers to channel estimates, and R refers to what may be considered the true achievable rate for a given channel estimate H and reference link configuration $\tilde{c}$ combination of the dataset.

At least some values of the training dataset may be obtained using simulations or measurements, i.e. simulated or measured data.

The channel estimate H may represent a plurality, e.g. a matrix, of complex coefficients respectively representing a plurality of resource elements comprising all or a majority of the resource elements of a resource grid, and including resource elements corresponding to pilot symbols. The matrix may be indicative of multiple time slots and multiple sub-carriers for representing the one or more estimated link characteristics. The matrix of complex coefficients may represent the respective positions of pilot symbols in a resource block and other non-pilot symbols, whether non-data or data carrying resource elements.

Data representing the true achievable rate R for a given channel estimate and reference link configuration combination may be determined mathematically, for example using a given batch of the training data representing a channel estimate H for a particular reference link configuration $\tilde{C}$. An example method for a mathematical determination follows.

Many commercial communication systems rely on bit-interleaved coded modulation (BICM), for which a known achievable rate is called the bit-wise mutual information (BMI):

$$R_{BMI} := \sum_{i=1}^{l} I(b_i, y) \qquad (2)$$

where l is the number of bits per link used, I(.,.) is the mutual information, $b_1, \ldots, b_l$ is the bits transmitted over a link, and y is the corresponding received symbol. The BMI depends on the modulation scheme and pilot pattern used, and therefore on a combination $\tilde{c} \in \tilde{C}$. It is therefore independent of the channel code, and therefore of the code rate.

However, equation (2) assumes an ideal receiver, i.e. one that performs maximum likelihood detection (MLD). In practice, MLD cannot be used, especially on realistic links, as it is very complex to implement.

An achievable determination of the true achievable rate R, assuming an imperfect receiver, may be provided by:

$$R_{IRX} := R_{BMI} - \sum_{i=1}^{l} \mathbb{E}[D_{KL}(p(b_i \mid y) \| \hat{p}(b_i \mid y))] \qquad (3)$$

where $D_{KL}(\cdot \| \cdot)$ is the Kullback-Leibler divergence, the expectation is over y, $p(b_i|y)$ is the true probability of $b_i$ to have been transmitted given y, and $\hat{p}(b_i|y)$ is the probability of $b_i$ to have been transmitted given y approximated by the receiver. The second term on the right-hand side accounts for the rate loss due to an imperfect receiver.

It is found that the achievable rate $R_{IRX}$ can be re-written using the total binary cross-entropy:

$$R_{IRX} = l - \sum_{i=1}^{l} \mathbb{E}[H(p(b_i \mid y), \hat{p}(b_i \mid y))] \qquad (4)$$

where H(.,.) is the cross-entropy, and the second term on the right-hand side is the total binary cross-entropy. Therefore, minimizing the total binary cross-entropy is equivalent to maximizing the achievable rate considering an imperfect receiver.

Therefore, the true achievable rate can be estimated using:

$$T = m + \frac{1}{B} \sum_{j=1}^{B} \sum_{i=1}^{l} \left( b_i^{(j)} \log\left(\hat{p}\left(b_i^{(j)}\right)\right) + \left(1 - b_i^{(j)}\right) \log\left(1 - \hat{p}\left(b_i^{(j)}\right)\right) \right) \qquad (5)$$

where B is the batch size, i.e., the number of samples used to compute the estimation, and (j) refers to the jth batch example. T depends only on a combination $\tilde{c}$ of modulation scheme and pilot pattern $\mathcal{P}$ and the result given in bits per resource element.

To get the achievable rate in bits per PRB, denoted by R, we can multiply T by the number of data-carrying resource elements in a PRB, which depends on the pilot pattern, i.e., $$R = T \times \#(\text{data carrying resource element in a PRB}) \qquad (6)$$

FIGS. 6A and 6B are schematic views of an example architecture for training a computational model 400 using the above-mentioned training dataset and thereafter using the trained computational model as part of the rate estimation module 124 shown in FIGS. 1 and 4. As shown in FIG. 6A, a residual convolutional neural network 600 may be used, comprising an input convolutional layer 601, one or more residual neural network (ResNet) blocks 602, an output convolutional layer 603 and an average pooling layer 604. FIG. 6B shows in more detail an example known structure of a residual neural network block 602.

FIG. 7 is a flow diagram showing processing operations that may be performed as part of the above-mentioned computational model training process. The process may comprise fewer or greater operations in some embodiments. The operations may be performed in hardware, software, firmware or a combination thereof.

A first operation 701 may comprise initializing the computational model, e.g. by initializing the weights randomly.

A second operation 702 may comprise sampling B examples from the training dataset, e.g.:

$$(\tilde{c}^{(i)}, H^{(i)}, R^{(i)}), i = 1 \ldots B'.$$

A third operation 703 may comprise computing achievable rate predictions $\hat{R}(\tilde{c}^{(i)})$ from the channel estimates $H^{(i)}$. [ono] A fourth operation 704 may comprise iteratively updating the model (i.e. the parameters or weights) for example based on a descent algorithm, e.g. by performing one step of Stochastic Gradient Descent (SGD) on the mean squared error (MSE):

$$MSE = \frac{1}{B'} \sum_{i=1}^{B'} \left| \hat{R}(\tilde{c}^{(i)}) - R^{(i)} \right|^2 \qquad (7)$$

A fifth operation 705 may comprise determining if a stop criterion is met. If yes, a sixth operation 706 may comprise stopping the training process. If not, the process may return to the second operation 702.

The stop criterion in the fifth operation 705 may comprise different methods. For example, the training may stop after a predetermined number of iterations or when the loss function used in SGD has not decreased for a predetermined number of iterations. In some example aspects, hyper parameters such as learning rate, batch size, and possibly other parameters of a SGD variant, may comprise optimization hyper parameters.

As an alternative to using a trained computational model 400, so-called Monte Carlo methods may be used based on the link estimate H. For example, link outputs could be simulated based on randomly sampled link inputs and noise models, assuming the link estimate H is the true link response. The use of a trained computational model 400 is, however, found to be computationally less expensive.

Configuration Selection Module 126

Referring to FIGS. 1 and 8, a configuration selection module 126 is provided for performing selection of a particular one of the usable link configurations $\mathcal{C}$ referred to in the UC table 300 of FIG. 3 for achieving an improved data throughput whilst maintaining a low error rate.

The configuration selection module 126 may receive as input the set of estimated achievable data rates $\hat{R}(\tilde{c}1) \ldots \hat{R}(\tilde{c}N)$ from the rate estimation module 124. These estimated achievable data rates $\hat{R}(\tilde{c}1) \ldots \hat{R}(\tilde{c}N)$ for the different combinations of reference link configurations $\tilde{c} \in \tilde{\mathcal{C}}$ can be extended to the usable link configurations $c \in \mathcal{C}$ based on corresponding modulation scheme and pilot pattern, because the estimates do not depend on the code rate.

Therefore, given a usable link configuration $c=(m_i, u_j, p_k)$, we may define its achievable rate $\hat{R}(c)$ as:

$$R(c) := \hat{R}(\tilde{c}), \text{ where } \tilde{c}=(m_i, p_k) \tag{8}$$

The configuration selection module 126 may be configured to select a particular one, referred to herein as "C*", of the usable link configurations in the UC table 300 of FIG. 3. The configuration selection module 126 may then send an indication thereof to the transmitter 100 over a control link 128 for enabling the transmitter 100 to adapt the modulation no to the selected link configuration C.

This feedback may be direct or indirect and may be performed over a wired or wireless link.

In some example aspects, the configuration selection module 126 may select the usable link configuration C* which has the highest advertised data rate (c) but which does not exceed the achievable data rate r(c) of the corresponding reference link configuration, which would otherwise cause the error rate to increase given that the achievable data rate r(c) gives a more accurate representation. This may be performed by the configuration selection module 126 first filtering-out, or excluding, those usable data link configurations c for which the advertised data rate is the same, or higher than, the achievable data rate. In other words, the configuration selection module 126 may filter the usable data link configurations c to exclude those having an advertised data rate equal or greater to the estimated achievable rate for the corresponding link configuration. From the filtered list, a usable data link configuration c is selected, for example the one having the highest value of r(c) is selected as C* and fed back to the transmitter 100.

This may be expressed as:

$$c^* = \underset{c \in C}{\operatorname{argmax}} \{r(c) \mid r(c) < \hat{R}(c)\} \tag{9}$$

In this way, the usable link configuration C* having the highest throughput is chosen in such a way that its data rate will achieve low probability of error.

In some example aspects, equation (9) may be modified to include the parameter $\epsilon$. As practical forward error correction (FEC) codes do not enable arbitrarily small error rates, even when operating at rates below the achievable rate, this non-negative parameter E servers to safeguard against high error rates, and can be used to control a tradeoff between high throughput and the desired error rate. Typically, a small value of E is sufficient, e.g. 0.1 bits per resource element and so, similar to equation (6), the value 0.1 may be multiplied by the number of data-carrying resource elements.

Equation (9) may therefore be modified to:

$$c^* = \underset{c \in C}{\operatorname{argmax}} \{r(c) \mid r(c) < \hat{R}(c) - \epsilon\} \tag{10}$$

Figures 9, 10:
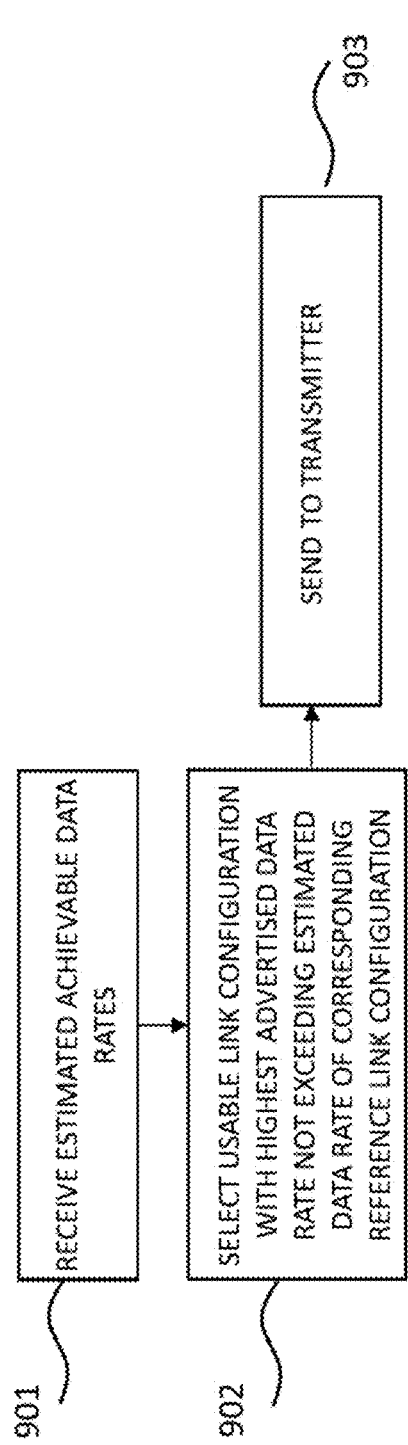
FIG. 9 is a flow diagram indicating operations for selecting a link configuration according to an example embodiment.
FIG. 10 is a tabular representation of a data structure which may be useful for understanding the operation of the FIG. 8 configuration selection module.

FIG. 9 is a flow diagram showing processing operations that may be performed as part of the above-mentioned selection process. The process may comprise fewer or greater operations in some embodiments. The operations may be performed in hardware, software, firmware or a combination thereof.

A first operation 901 may comprise receiving the estimated achievable data rates.

A second operation 902 may comprise selecting the usable link configuration with the highest advertised data rate which does not exceed the estimated data rate of the corresponding reference link configuration.

A third operation 903 may comprise sending an indication of the selected usable link configuration to the transmitter 100.

FIG. 10 is a tabular visualization 950 of a data structure which may be useful for understanding the operation of the of configuration selection module 126. The first five columns 951-955 correspond to the first five columns 301-305 of FIG. 3, representing the UC table 300. The sixth column 956 indicates the estimated achievable rates R(c) given in bits per PRB, as indicated above, for comparison with the fifth column 955. It will be seen from box 960 that the same value of $\hat{R}(c1)$ can be used for the first two usable link configurations because the different data rates are irrelevant. As an example, if the values in the fifth column 955 for $r_3$, $r_4$ and $r_5$ exceed the respective values of $\hat{R}(c2)$, $\hat{R}(c3)$ and $\hat{R}(c4)$, then usable link configurations #3, #4 and #5 are excluded from selection. Then, one of the configurations #1 and #2 is selected which has the highest data rate r(c) in the fifth column.

Figure 11:
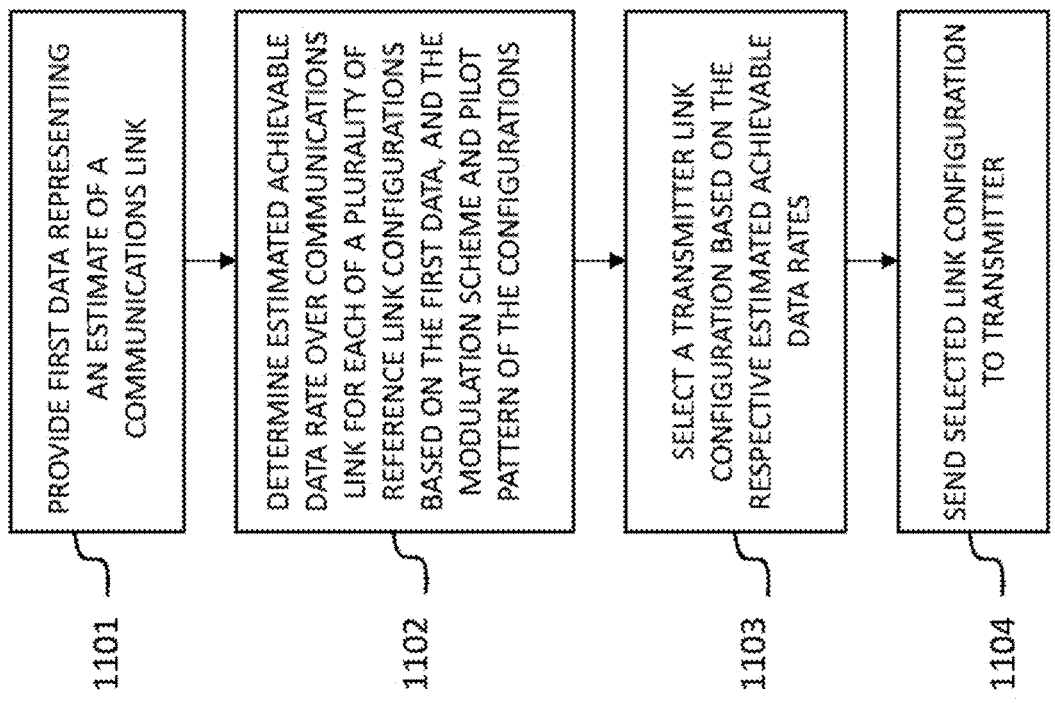
FIG. 11 is a flow diagram indicating operations according to an example embodiment.

FIG. 11 is a flow diagram showing processing operations that may be performed according to example aspects. The process may comprise fewer or greater operations in some aspects. The operations may be performed in hardware, software, firmware or a combination thereof.

A first operation 1101 may comprise providing first data representing an estimate of a communications link based on a signal received over said communications link from a transmitter.

A second operation 1102 may comprise determining an estimated achievable data rate over said communications link for each of a plurality of link configurations which have respective combinations of modulation scheme and pilot symbol pattern which correspond to one or more transmitter link configurations, the estimated achievable data rate for a particular link configuration being determined based on the first data, and the modulation scheme and the pilot pattern of the particular reference link configuration.

A third operation 1103 may comprise selecting a transmitter link configuration based on the respective estimated achievable data rates.

A fourth operation 1104 may comprise sending an indication of the selected link configuration to the transmitter.

At the transmitter, if the indicated selected link configuration is different from that currently used, the selected link configuration may be used in place of the current one (i.e. it is adapted).

Advantages of example aspects include enabling transmitter adaptation in an improved way by taking into account multiple link characteristics or features, including respective combinations of modulation scheme and pilot pattern. Example aspects may therefore be more accurate and beneficial in terms of throughput than adaptation methods that are based only on, for example, a channel quality indicator (CQI) which is a scalar value based on an estimate of signal-to-noise ratio (SNR). Also, if the computational model receives channel estimates for the entire, or a substantial part of the received resource grid, instead of using a single scalar such as average SNR, it is possible to predict how time and spatial correlations impact the rate, given a sub-optimal receiver. This enables a more accurate estimate of the achievable rate as it accounts for Doppler and delay spread.

Accuracy is furthermore enabled by determining estimated achievable data rates for reference link configurations using assumptions on non-ideal receivers and, for example, using bit-wise mutual information (BMI).

Further advantages may result from the use of a computational model for determining the estimated achievable data rates, whereby, for an uplink, the computational model can be trained at a communications cell base station or some other node, e.g. in a core network, for one or more particular transmitters, e.g. all user terminals associated with the base station. The model may thereafter be deployed to the base station which serves as the receiver in this situation. For a downlink, the computational model may be trained for a specific receiver, e.g. a user terminal or type of user terminal, e.g. different computational models may be trained for user terminals provided by different manufacturers. Training may be performed offline and/or remote from user terminals given their limited processing capabilities and the terminals updated with the trained computational model.

The computational model, during training, may adapt to the particular link conditions of a given receiver or receivers in a particular cell.

Specific Examples of Technical Purpose

Example aspects may comprise use of the rate estimation and configuration selection methods and modules 124, 126 described herein for one or more technical purposes. For example, the methods and modules 124, 126 may be provided as part of a communications receiver, e.g. at a cellular communications base station and/or mobile terminal, among other examples.

Evaluation

Figure 12:
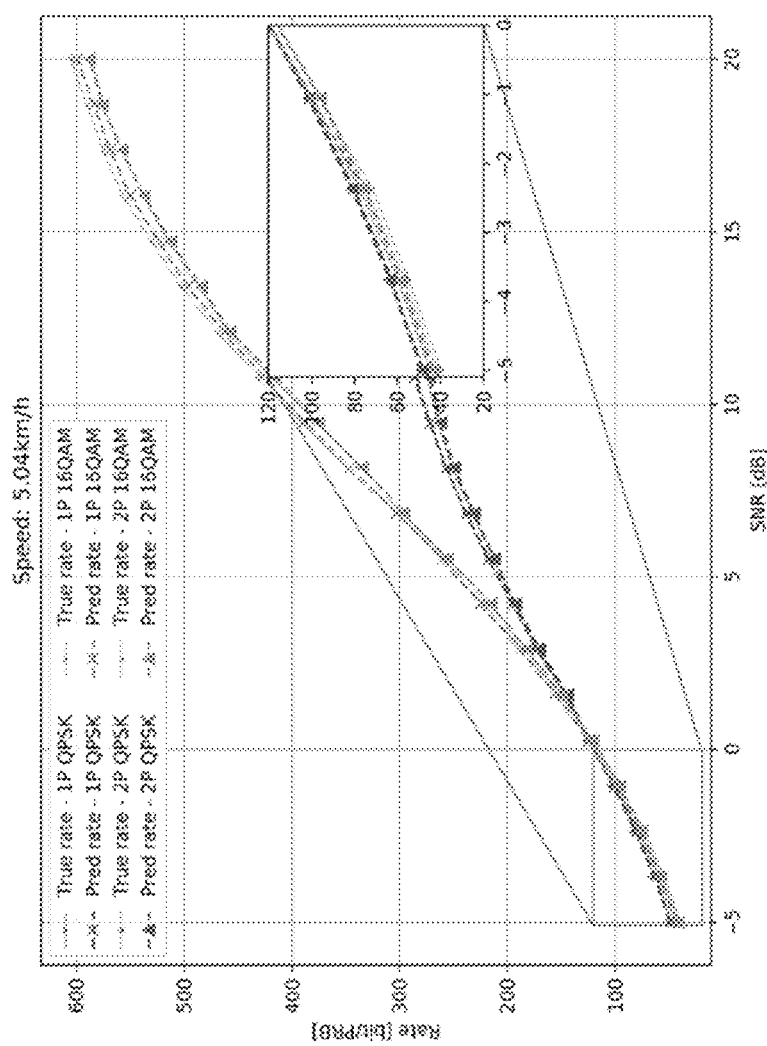
FIG. 12 is a graph indicating simulation results over a first range type.
Figure 13:
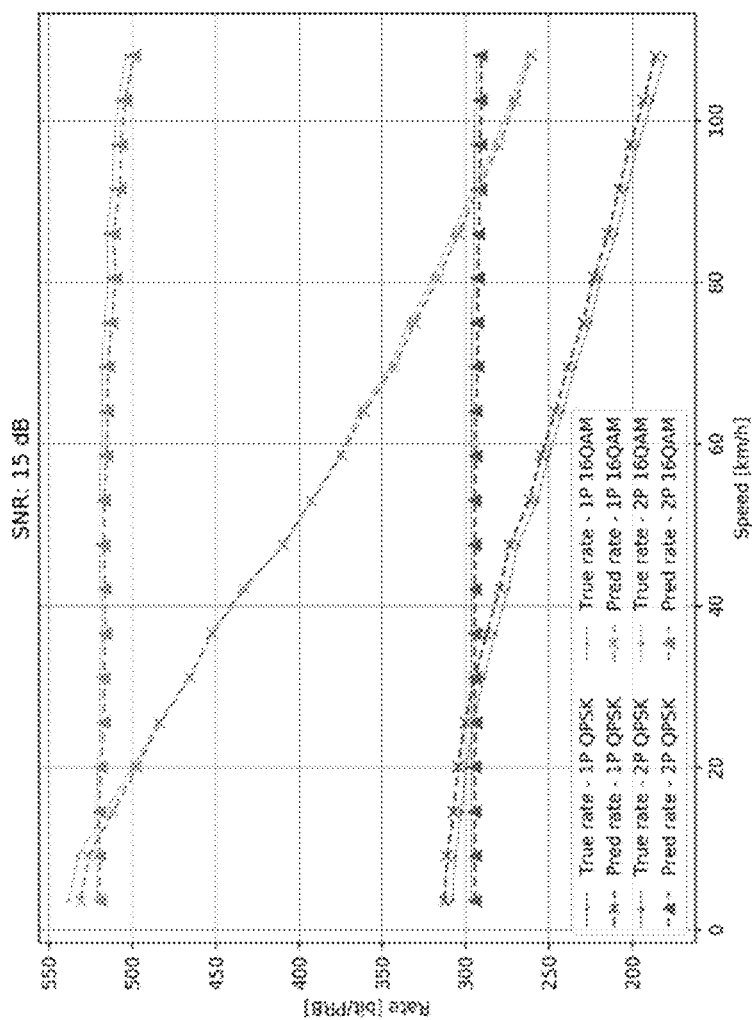
FIG. 13 is a graph indicating simulation results over a second range type.

FIGS. 12 and 13 provide simulation results which may be useful for understanding advantages of example aspects. FIG. 12 shows estimated and true achievable data rates over a SNR range in dBs whereas FIG. 13 shows estimated and true achievable data rates over a speed range in km/h.

The estimated achievable data rates, determined by the rate estimation module 124, were evaluated using a channel model comprising (merely by way of example) a Jakes Doppler power spectrum and a 3GPP tapped delay line (TDL-A) power delay profile.

A computational model for estimating achievable data rates was trained for QPSK and 16QAM modulation schemes, and for two pilot patterns from the 5G New Radio (NR) standard, resulting in 4 possible combinations. The computational model, a Neural Network, was trained as described above for signal-to-noise SNRs ranging from −10 to 25 dB and for speeds ranging from 0 to 125 km/h.

In these simulations, the computational model received as input a channel matrix of dimension 1 transmission timing interval (TTI) with 14 time slots and 72 subcarriers, corresponding to 6 physical resource blocks (PRBs).

Figure 14A:
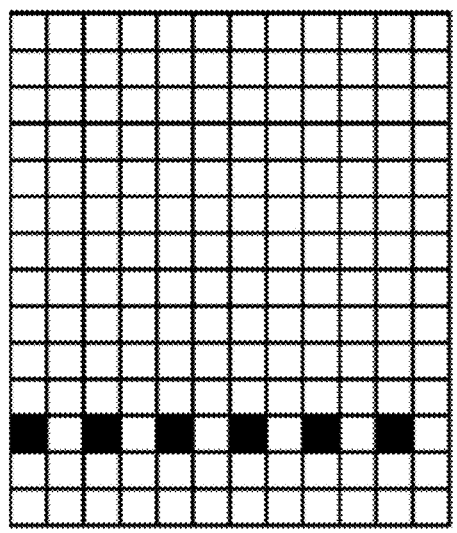
FIG. 14A is a graphical representation of a first pilot pattern used in simulations.
Figure 14B:
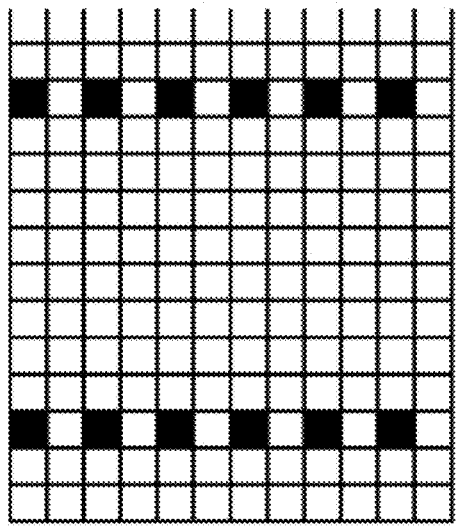
FIG. 14B is a graphical representation of a second pilot pattern used in simulations.

As shown in FIGS. 12 and 13, the computational model was able accurately to estimate the achievable data rates, in bits per PRB, when the SNR and the speed variate. The two pilot patterns are indicated in FIGS. 12 and 13 as 1P and 2P and graphical representations respectively shown in FIGS. 14A and 15B In the above description, the link estimation module 120 and the configuration selection module 126 are provided at the receiver 102 so that an indication of selected link configuration is sent to the transmitter 100. In an alternative embodiment, the link estimation module 120 and the configuration selection module 126 may be provided at the transmitter 100. The transmitter 100 may receive the link estimation H from the receiver 102, possibly in compressed form, and otherwise may perform the same or similar operations to those described above.

Hardware

Figure 15:
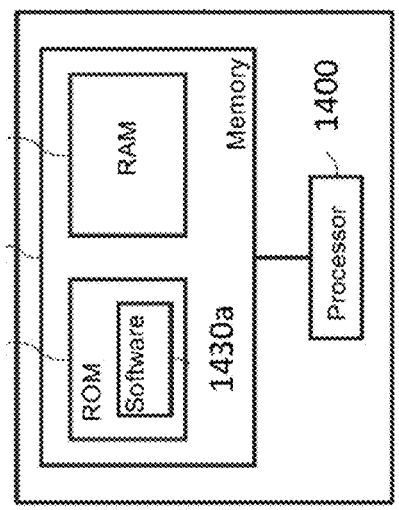
FIG. 15 is a block diagram of an apparatus according to an example embodiment.

For completeness, FIG. 15 is an example schematic diagram of components of one or more of the apparatuses or modules thereof described above. FIG. 15 shows an apparatus according to an embodiment. The apparatus may be configured to perform the operations described herein, for example operations described with reference to FIGS. 7, 9 and/or 11. The apparatus comprises at least one processor 1400 and at least one memory 1410 directly or closely connected to the processor. The memory 1410 includes at least one random access memory (RAM) 1410*b* and at least one read-only memory (ROM) 1410*a*. Computer program code (software) 1430 is stored in the ROM 1410*a*. The at least one processor 1400, with the at least one memory 1410 and the computer program code 1430 are arranged to cause the apparatus to at least perform at least the method according to FIGS. 7, 9 and/or 11.

Figure 16:
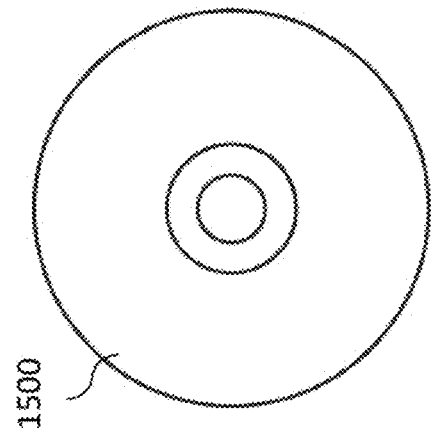
FIG. 16 is a representative view of a non-transitory medium for storing computer-readable code which, when executed by one or more processors or controllers, may perform operations according to an example embodiment.

FIG. 16 shows a non-transitory media 1500 according to some embodiments. The non-transitory media 1500 is a computer readable storage medium. It may be e.g. a CD, a DVD, a USB stick, a blue ray disk, etc. The non-transitory media 1500 stores computer program code causing an apparatus to perform the method of FIGS. 7, 9 and/or 11.

The processing apparatus of FIG. 15 may be at least part of a standalone computer, a server, a console, an apparatus, a user device, a mobile communication device, an IoT device, a sensor, a software application, a communication network, or any combination thereof. In some example embodiments, the processing apparatus may also be associated with external software applications. These may be applications stored on a remote server device and may run partly or exclusively on the remote server device. These applications may be termed cloud-hosted applications. The processing apparatus may be in communication with the remote server device in order to utilize the software application stored there.

Some example embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions), and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 7, 9 and 11 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
a processor; and
a memory including instructions, the instructions, when executed by the processor, cause the apparatus to:
provide first data representing an estimate of a communications link based on a signal received over said communications link from a transmitter;
determine an estimated achievable data rate over said communications link for each of a plurality of link configurations which have respective combinations of modulation scheme and pilot symbol pattern which correspond to one or more transmitter link configurations, the estimated achievable data rate for a particular link configuration being determined based on the first data, and the modulation scheme and the pilot pattern of the particular reference link configuration, and wherein each of the transmitter link configurations has a respective advertised data rate; and
select a transmitter link configuration by:
filtering the transmitter link configurations to exclude those having an advertised data rate greater than the estimated achievable data rate for the corresponding link configuration; and
selecting one of the remaining link configurations.

2. The apparatus of claim 1, wherein the first data represents a plurality of complex coefficients respectively representing individual link estimates for a plurality of resource elements comprising all or a majority of the resource elements of a resource grid of the received signal.

3. The apparatus of claim 1, wherein the estimated achievable data rate for each of the link configurations is computed using a computational model which receives the first data as input.

4. The apparatus of claim 3, wherein the computational model is trained based on a training dataset comprising, for each link configuration, (i) first training data representing one or more link estimates and, (ii) second training data representing an achievable data rate for the one or more link estimates of each link configuration.

5. The apparatus of claim 4, wherein the first training data comprises a plurality of complex coefficients respectively representing individual link estimates for a plurality of resource elements comprising all or a majority of the resource elements of a resource grid.

6. The apparatus of claim 4, wherein the second training data is provided by calculating mathematically an estimate of a true achievable data rate for a given batch of the first training data for each link configuration.

7. The apparatus of claim 6, wherein the estimate of the true achievable data rate is calculated mathematically based on bit-wise mutual information and using an expression which depends only on the modulation scheme and pilot symbol pattern of the particular link configuration.

8. The apparatus of claim 1, wherein the estimated achievable data rates are determined in units of bits per physical resource block (bits/PRB).

9. The apparatus of claim 1, wherein the selected transmitter link configuration is that having the highest advertised data rate.

10. The apparatus of claim 1, wherein, prior to filtering, the advertised data rate for each of the transmitter link configurations is reduced by a predetermined parameter $\in$.

11. The apparatus of claim 1, wherein the first data represents estimated frequency response characteristics of a communications link based on receipt of a multi-carrier modulated signal.

12. A method, comprising:
provining first data representing an estimate of a communications link based on a signal received over said communications link from a transmitter;
determining an estimated achievable data rate over said communications link for each of a plurality of link configurations which have respective combinations of modulation scheme and pilot symbol pattern which correspond to one or more transmitter link configurations, the estimated achievable data rate for a particular link configuration being determined based on the first data, and the modulation scheme and the pilot pattern of the particular reference link configuration, and wherein each of the transmitter link configurations has a respective advertised data rate; and
selecting a transmitter link configuration by:
filtering the transmitter link configurations to exclude those having an advertised data rate greater than the estimated achievable data rate for the corresponding link configuration; and
selecting one of the remaining link configurations.

13. The method of claim 12, wherein the first data represents a plurality of complex coefficients respectively representing individual link estimates for a plurality of resource elements comprising all or a majority of the resource elements of a resource grid of the received signal.

14. The method of claim 12, wherein the estimated achievable data rate for each of the link configurations is computed using a computational model which receives the first data as input.

15. The method of claim 14, wherein the computational model is trained based on a training dataset comprising, for each link configuration, (i) first training data representing one or more link estimates and, (ii) second training data representing an achievable data rate for the one or more link estimates of each link configuration.

16. The method of claim 15, wherein the first training data comprises a plurality of complex coefficients respectively representing individual link estimates for a plurality of resource elements comprising all or a majority of the resource elements of a resource grid.

17. The method of claim 15, wherein the second training data is provided by calculating mathematically an estimate of a true achievable data rate for a given batch of the first training data for each link configuration.

18. The method of claim 17, wherein the estimate of the true achievable data rate is calculated mathematically based on bit-wise mutual information and using an expression which depends only on the modulation scheme and pilot symbol pattern of the particular link configuration.

19. The method of claim 12, wherein the estimated achievable data rates are determined in units of bits per physical resource block (bits/PRB).

20. A non-transitory computer-readable medium comprising a computer program which, when executed on an apparatus, causes the apparatus to:
provide first data representing an estimate of a communications link based on a signal received over said communications link from a transmitter;
determine an estimated achievable data rate over said communications link for each of a plurality of link configurations which have respective combinations of modulation scheme and pilot symbol pattern which correspond to one or more transmitter link configurations, the estimated achievable data rate for a particular link configuration being determined based on the first data, and the modulation scheme and the pilot pattern of the particular reference link configuration, and wherein each of the transmitter link configurations has a respective advertised data rate; and
select a transmitter link configuration by:
filtering the transmitter link configurations to exclude those having an advertised data rate greater than the estimated achievable data rate for the corresponding link configuration; and
selecting one of the remaining link configurations.

* * * * *